(12) United States Patent
Kolar et al.

(10) Patent No.: US 8,690,116 B2
(45) Date of Patent: Apr. 8, 2014

(54) BASE FOR A BLENDER

(75) Inventors: David J. Kolar, Stow, OH (US); Robert M. Ulanski, Broadview Heights, OH (US)

(73) Assignee: Vita-Mix Corporation, Cleveland, OH (US)

( * ) Notice: Subject to any disclaimer, the term of this patent is extended or adjusted under 35 U.S.C. 154(b) by 37 days.

(21) Appl. No.: 12/657,749

(22) Filed: Jan. 27, 2010

(65) Prior Publication Data

US 2010/0219324 A1 Sep. 2, 2010

Related U.S. Application Data

(60) Provisional application No. 61/209,062, filed on Mar. 2, 2009.

(51) Int. Cl.
*F16M 1/00* (2006.01)

(52) U.S. Cl.
USPC .............................. 248/672; 248/678; 248/638

(58) Field of Classification Search
CPC ................................ A47J 43/07; A47J 43/085
USPC ............... 248/638, 637, 672, 678; 241/282.1, 241/282.2, 95, 92, 199.12; 99/510, 511, 99/513; 366/197, 199, 205, 314, 601; 310/51, 62, 63; 165/109.1; 454/339
See application file for complete search history.

(56) References Cited

U.S. PATENT DOCUMENTS

| | | | | |
|---|---|---|---|---|
| 3,064,949 A | | 11/1962 | Dewenter | 259/108 |
| 3,493,214 A | * | 2/1970 | Main et al. | 241/282.2 |
| 3,901,484 A | * | 8/1975 | Ernster | 241/282.2 |
| 4,071,789 A | * | 1/1978 | Ernster et al. | 310/50 |
| 5,273,358 A | * | 12/1993 | Byrne et al. | 366/205 |
| 5,355,784 A | * | 10/1994 | Franklin et al. | 99/492 |
| 5,696,358 A | * | 12/1997 | Pfordresher | 181/198 |
| 6,069,423 A | * | 5/2000 | Miller et al. | 310/51 |
| 6,499,873 B1 | * | 12/2002 | Chen | 366/197 |
| 6,595,113 B1 | * | 7/2003 | Chang | 99/337 |
| 6,680,551 B2 | * | 1/2004 | Bates et al. | 310/62 |
| 6,811,303 B2 | * | 11/2004 | Dickson, Jr. | 366/206 |
| 7,174,822 B2 | * | 2/2007 | Friel, Sr. | 83/707 |
| 7,320,542 B2 | * | 1/2008 | Tai | 366/205 |
| 7,568,646 B2 | * | 8/2009 | Lin | 241/282.1 |
| 7,685,914 B2 | * | 3/2010 | Friel, Sr. | 83/707 |
| 7,942,570 B2 | * | 5/2011 | Steiner et al. | 366/197 |
| 8,066,426 B2 | * | 11/2011 | Sandford et al. | 366/205 |
| 2005/0152215 A1 | * | 7/2005 | Stuart et al. | 366/205 |
| 2006/0007778 A1 | | 1/2006 | Tai | 366/205 |
| 2007/0133347 A1 | * | 6/2007 | Mok et al. | 366/205 |

(Continued)

OTHER PUBLICATIONS

EPO International Search Report (2 pages, dated Jun. 25, 2010).

*Primary Examiner* — Terrell McKinnon
*Assistant Examiner* — Monica Millner
(74) *Attorney, Agent, or Firm* — Renner, Kenner, Greive, Bobak, Taylor & Weber

(57) ABSTRACT

A base for a blender housing a motor and including controls for operation of the blender. The base includes an air intake, an air exhaust, and a baffle, wherein the air exhaust and baffle are formed as a part of the bottom of the blender base and act to reduce the sound emitted by the blender. The bottom of the blender base includes an internal cavity defined partially by a support flange where heated air is exhausted. The air is then forced to change directions before exiting through exhaust ports.

20 Claims, 2 Drawing Sheets

(56) References Cited

U.S. PATENT DOCUMENTS

| | | | |
|---|---|---|---|
| 2008/0098905 A1* | 5/2008 | Steiner et al. | 99/451 |
| 2009/0084275 A1* | 4/2009 | Liang | 99/513 |
| 2009/0095459 A1* | 4/2009 | Williams et al. | 165/177 |

* cited by examiner

BASE FOR A BLENDER

This application claims priority from U.S. provisional patent application Ser. No. 61/209,062 filed on Mar. 2, 2009, which is incorporated herein by reference in its entirety.

TECHNICAL FIELD

This invention relates to a base for a food processor, the base housing a motor and including controls for operation of the food processor. More particularly, this invention relates to such a base having an air intake, an air exhaust, and a baffle, wherein the air exhaust and baffle are formed as a part of the bottom of the food processor base and act to reduce the sound emitted by the food processor.

BACKGROUND ART

Food processors, or blenders, are well known and are available with a variety of features and options. Food processors may be designed for home use or for commercial use, and typically perform a mixing function for a drink or other food. When utilized in businesses, such as restaurants or coffee shops, the food processor is often positioned adjacent to a serving or dining area so that the food or drinks may be prepared as ordered. When so placed, it is desirable to reduce the sound emitted by the food processor so that customers are not distracted or disturbed by its sound as is processes or mixes a drink.

Various methods are known to reduce the sound created by a food processor. One such method includes providing an enclosure around the container of the food processor to contain the noise created by the mixing being performed. While this method of noise reduction can be at least somewhat effective, it fails to address the noise created by the motor within the base of the food processor. The motor is a direct source of noise when in operation, and also is an indirect source of noise due to the vibration it creates within the base. The vibrations created by the operating motor cause the base itself, and other components within the base, to vibrate, thereby generating additional noise.

Cooling air is typically provided to the motor within the base to prevent overheating. This cooling air may be drawn in through an air inlet and forced out of the base through an air exhaust. The airflow exiting the base of the food processor carries the noise created therein during operation of the food processor to the exterior of the base, effectively amplifying the sound. Previous attempts have been made to provide a baffle within the base to suppress the noise carried by the cooling airflow, but these attempts have been ineffective for various reasons, including complexity of the design and difficulty in manufacturing.

Thus, the need exists for a food processor base that allows for sufficient cooling of the motor therein while also providing a simple mechanism for baffling the airflow to reduce noise created by the food processor.

DISCLOSURE OF THE INVENTION

It is thus an object of one aspect of the present invention to provide a base for a food processor including an integral baffle to reduce the noise created by a motor within the base.

It is an object of another aspect of the present invention to provide a base for a food processor, as above, wherein the baffle is partially formed by the bottom surface of the base.

It is an object of an additional aspect of the present invention to provide a base for a food processor, as above, wherein the bottom surface includes a support flange that defines an inner cavity.

These and other objects of the present invention, as well as the advantages thereof over existing prior art forms, which will become apparent from the description to follow, are accomplished by the improvements hereinafter described and claimed.

In general, a base for a food processor according to the concepts of the present invention includes a bottom surface, a support flange extending from and surrounding at least a portion of the bottom surface to create an internal cavity, a baffle projection extending from the bottom surface within said internal cavity, and an outlet port positioned and an exhaust vent in the internal cavity wherein the outlet port and the exhaust vent are positioned on opposing sides of said baffle projection.

In accordance with another aspect of the present invention, a base for a food processor includes a rear surface, an air intake vent in the rear surface, a motor within the base, a bottom surface, a support flange extending from and surrounding at least a portion of the bottom surface to create an internal cavity, a baffle projection extending from the bottom surface within the internal cavity, and an outlet port and an exhaust vent positioned in the internal cavity, wherein the outlet port and the exhaust vent are positioned on opposing sides of the baffle projection.

A preferred exemplary base for a food processor according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
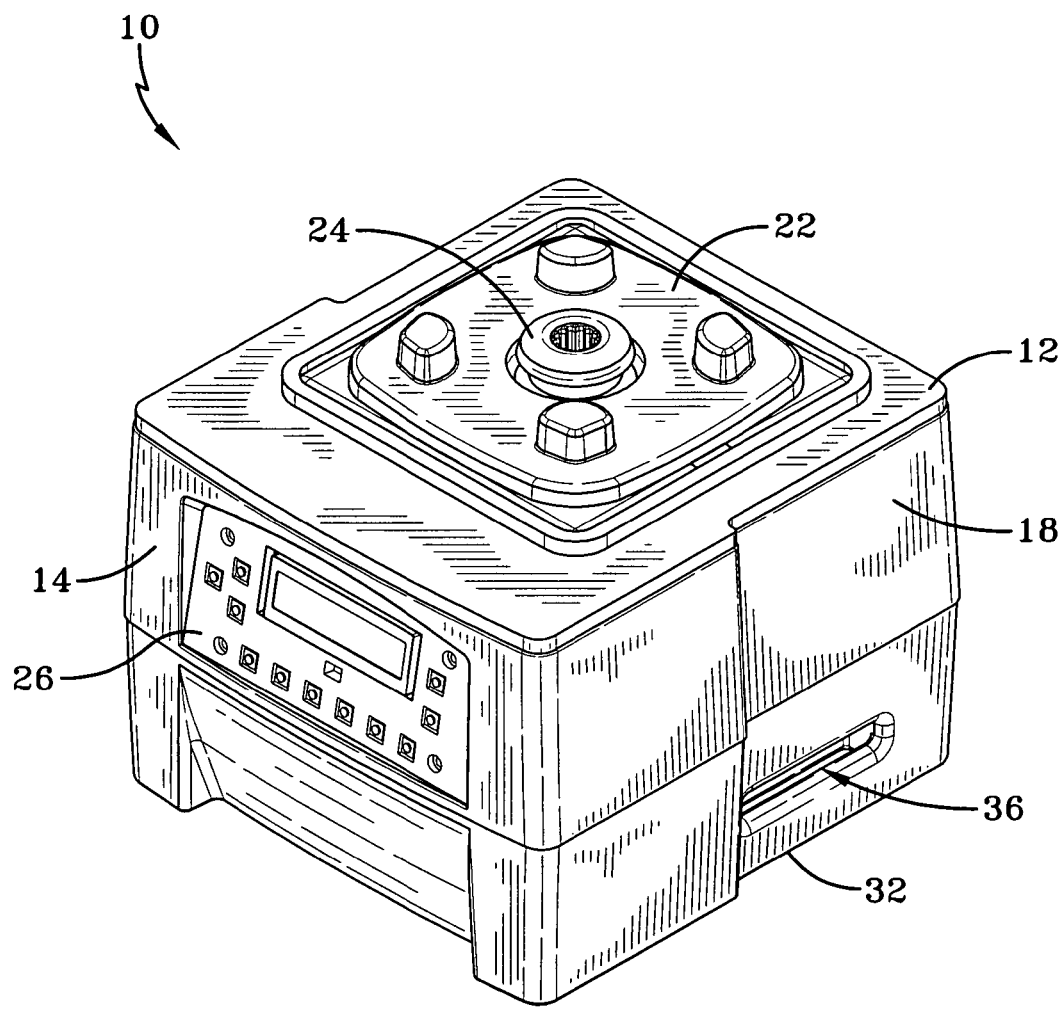
FIG. 1 is a perspective view of a base of a food processor made in accordance with the concepts of the present invention.

A base for a food processor or a blender made in accordance with the present invention is indicated generally by the numeral 10. Base 10 includes a top surface 12, a front surface 14, a rear surface 16 (FIG. 2), opposed side surfaces 18, and a bottom surface 20 (FIG. 3). Top surface 12 includes a pedestal 22 and a rotating and splined shaft coupler 24, each adapted to mate with a container that may be selectively positioned on base 10. Splined shaft coupler 24 is carried by the rotating shaft of a motor (not shown) within base 10, and rotates when the motor is actuated. Front surface 14 includes a control panel 26 that may include, for example, a display unit, speed controls, and an on/off switch. Base 10 may be sized and shaped as desired based upon both aesthetic and functional considerations.

Figure 2:
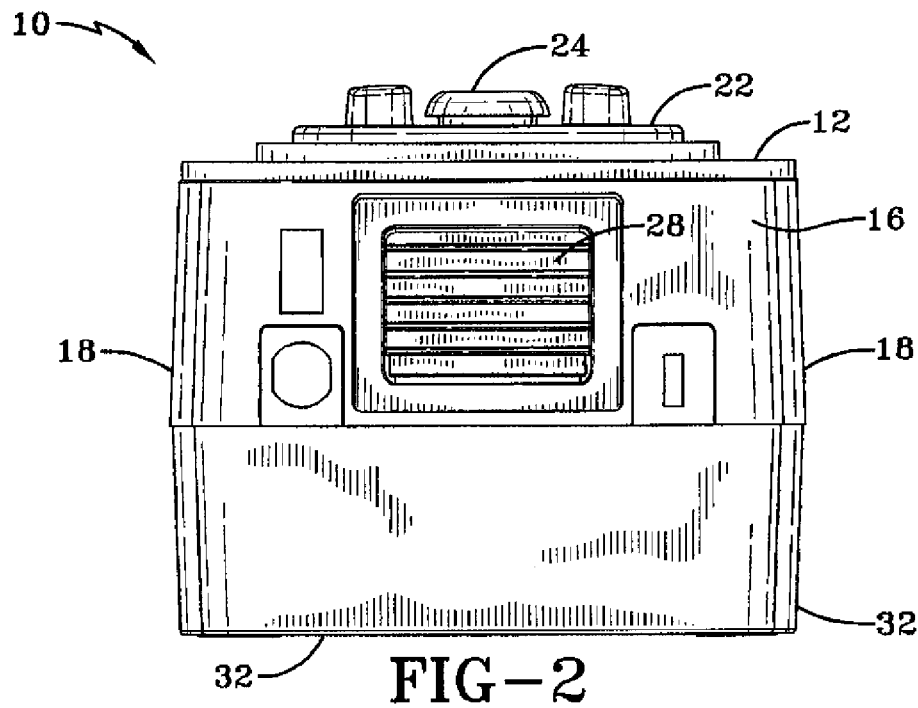
FIG. 2 is a rear elevational view of the base of FIG. 1.
Figure 3:
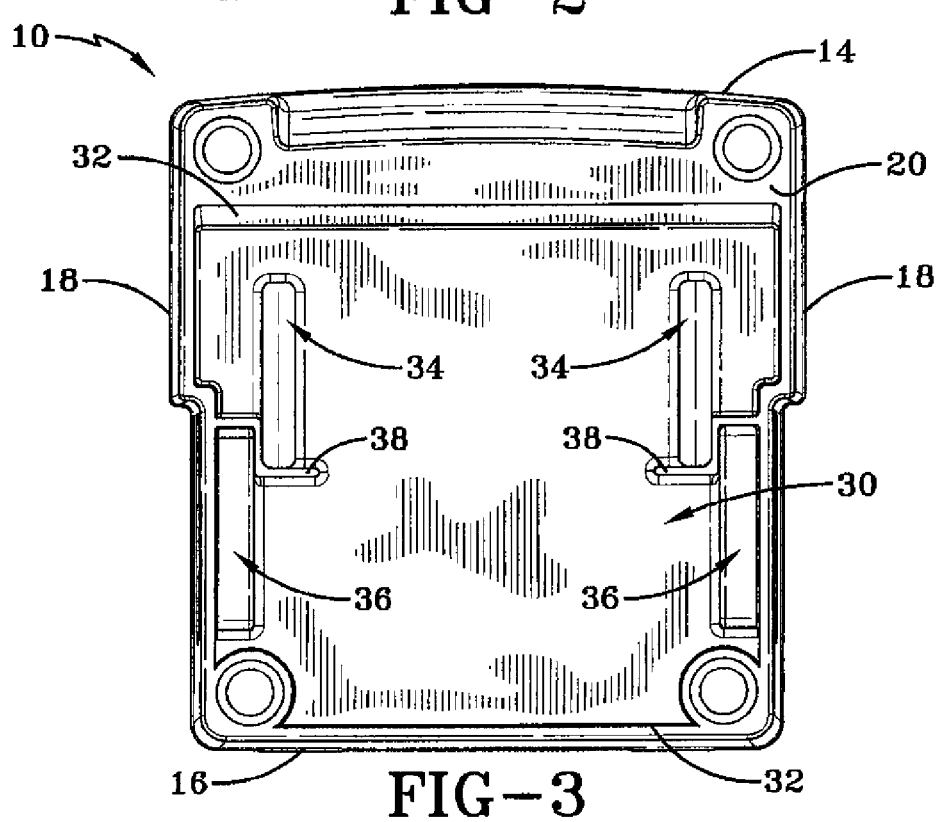
FIG. 3 is a bottom plan view of the base of FIG. 1.

Rear surface 16 includes an air intake vent 28, as shown in FIG. 2, through which cooling air is drawn into base 10. The cooling air is necessary to prevent the motor within base 10 from overheating. As is well known in the art, the air absorbs heat from the motor as it passes through base 10 around the motor, and carries the absorbed heat away from the motor. Air may be drawn into base 10 through air intake vent 28 by any method known to those skilled in the art, such as, for example, by providing a cooling fan within base 10 adjacent to air intake vent 28. Air intake vent 28 may be provided with louvered slats, or with any other known covering that helps to prevent dirt and other objects from being drawn into base 10 while allowing air to flow therethrough.

Bottom surface 20 of base 10 includes a support flange 32 extending from and surrounding at least a portion of the bottom surface. Base 10 is supported by support flange 32 when placed upon a surface, creating an internal cavity 30 defined by bottom surface 20, the support flange 32, and the surface upon which base 10 is positioned. As shown in the figures, support flange 32 is provided at the periphery of bottom surface 20. However, it is also contemplated that support flange 32 may be displaced inwardly from the periphery of bottom surface 20, so long as it encloses an area on the bottom surface to define the internal cavity, as discussed above. Two air outlet ports 34 are provided in bottom surface 20 within internal cavity 30 to permit heated air to exit base 10. Each air outlet port 34 is provided adjacent to a sidewall 18 of base 10. While two air outlet ports 34 are shown, it is also contemplated that more or less may be provided, and that they may be positioned in various configurations in bottom surface 20 within internal cavity 30.

An exhaust vent 36 is provided adjacent to each sidewall 18, and may be positioned in support flange 32 or it may extend from bottom surface 20 to sidewall 18. If the opening of exhaust vent 36 is located in sidewall 18, then exhaust vent 36 includes a vertical passage and a horizontal passage, thereby forcing air flowing through the exhaust vent to change directions. The exhaust vents 36 allow air to flow from within the inner cavity 30 while base 10 is resting on a support surface. It should be appreciated that although the exhaust vents 36 are discussed and shown as being located in bottom surface 20 and sidewalls 18 or support flange 32, it is also contemplated that the exhaust vents 36 may be provided in various other configurations without deviating from the scope of the invention.

A baffle projection 38 extends downwardly from bottom surface 20 between each air outlet port 34 and exhaust vent 36. Air flowing from each outlet port 34 must travel around the proximate projection 38 before exiting the inner cavity through the exhaust vents 36. Baffle projection 38 may, in certain embodiments, extend from an edge of outlet port 34 to an edge of exhaust vent 36. It is also contemplated that baffle projections 38 extend from bottom surface 20 for a distance approximately equal to the distance that support flange 32 extends from bottom surface 20. Baffle projections 38 and support flange 32 may both extend generally perpendicularly from bottom surface 20.

A baffle is created by bottom surface 20, support flange 32, the surface upon which base 10 is positioned, projections 38, and exhaust vents 36. The heated air exiting base 10 is forced to change directions, in some cases multiple times, within internal cavity 30 below bottom surface 20. By forcing the air and noise created by base 10 to change direction before exiting base 10, the baffle significantly reduces the noise transferred to the surrounding environment. Unlike the prior attempts to include baffles in the design of food processors, the base for a food processor as described herein is simple and easy to manufacture, and does not significantly increase the cost of production.

It is thus evident that a base for a food processor constructed as described herein accomplishes the objects of the present invention and otherwise substantially improves the art.

What is claimed is:

1. A base for a blender, the base being adapted to rest on a supporting surface, the base comprising a top surface, side surfaces extending downwardly from said top surface, a generally flat bottom surface extending between said side surfaces, a support flange extending downwardly from said bottom surface and adapted to contact the supporting surface thereby creating an enclosed internal cavity, the enclosure of said internal cavity being created by a top defined by said bottom surface, sides defined by said support flange, and a bottom defined by the supporting surface, an air outlet port in said bottom surface, an exhaust vent permitting air to leave said enclosed internal cavity, wherein the support flange extends around an entire periphery of the base such that the exhaust vent is entirely enclosed between the bottom surface, the support flange, and the supporting surface, and a baffle projection extending from said bottom surface within said internal cavity, said outlet port and said exhaust vent positioned on opposing sides of said baffle projection such that air flows downwardly through said outlet port and around said baffle projection before exiting said internal cavity through said exhaust vent.

2. A base for a blender comprising a bottom surface, a support flange extending from said bottom surface and adapted to contact a surface supporting the base to create an internal cavity, an air outlet port in said bottom surface, an exhaust vent permitting air to leave said internal cavity, said exhaust vent including a vertical passage and a horizontal passage, wherein the support flange extends around an entire periphery of the base such that the vertical passage of the exhaust vent is entirely enclosed between the bottom surface, the support flange, and the surface supporting the base, said vertical and horizontal passages causing air flowing through said exhaust vent to change direction and a baffle projection extending from said bottom surface within said internal cavity, said outlet port and said exhaust vent positioned on opposing sides of said baffle projection so that air flows through said outlet port and around said baffle projection before exiting said internal cavity through said exhaust vent.

3. The base of claim 1, wherein said exhaust vent is an opening in said support flange.

4. The base of claim 1, wherein said baffle projection is oriented generally perpendicular relative to said bottom surface.

5. The base of claim 1, wherein said support flange and said baffle projection both extend generally perpendicularly from said bottom surface for substantially the same distance.

6. The base of claim 1, wherein said baffle projection extends laterally from an edge of said outlet port to an edge of said exhaust vent.

7. A base for housing a motor of a blender comprising a rear surface, a top surface, a bottom surface, a front surface displaced from said rear surface, and opposed side surfaces extending between said front and rear surfaces and said top and bottom surfaces, an air intake vent in said rear surface, said bottom surface extending from one side surface to the other side surface, a support flange extending downwardly from said bottom surface and contacting a supporting surface to create an enclosed internal cavity, first and second air outlet ports in said bottom surface, first and second exhaust vents permitting air to leave said enclosed internal cavity, wherein the support flange extends around an entire periphery of the base such that the first and second exhaust vents are entirely enclosed between the bottom surface, the support flange, and the supporting surface, and first and second baffle projections extending downwardly from said bottom surface and oriented generally perpendicular relative to said bottom surface within said internal cavity, said first baffle projection positioned between said first outlet port and said first exhaust vent, and said second baffle projection positioned between said second outlet port and said second exhaust vent, said baffle projections causing air to flow downwardly through said outlet ports and around said baffle projections before exiting said internal cavity through said exhaust vents.

8. The base of claim 7, wherein each said exhaust vent includes a vertical passage extending through said bottom surface and a horizontal passage terminating in an opening in said sidewalls of the base.

9. The base of claim 7, wherein each said exhaust vent is an opening in said support flange.

10. The base of claim 7, wherein said baffle projections extend generally perpendicularly from said bottom surface.

11. The base of claim 7, wherein said support flange and said baffle projections extend generally perpendicularly from said bottom surface for substantially the same distance.

12. The base of claim 7, wherein each said baffle projection extends from an edge of said outlet port to an edge of said exhaust vent.

13. A base for a blender comprising a bottom surface, a support flange extending downwardly from said bottom surface and adapted to contact a surface supporting the base to create an internal cavity, an air outlet port in said bottom surface, an exhaust vent in said support flange permitting air to leave said internal cavity, said exhaust vent including a generally vertical passageway and a generally horizontal passageway, wherein the support flange extends around an entire periphery of the base such that the vertical passageway of the exhaust vent is entirely enclosed between the bottom surface, the support flange, and the surface supporting the base, said passageways causing air flowing through said exhaust vent to change direction, and a baffle projection extending downwardly from said bottom surface within said internal cavity, said outlet port and said exhaust vent positioned on opposing sides of said baffle projection, thereby causing air to flow downwardly through said outlet port and horizontally around said baffle projection before exiting said internal cavity through said exhaust vent.

14. A base for a blender, the base configured to rest on a supporting surface, comprising: a top surface; a plurality of side surfaces extending downwardly from the top surface; a bottom surface extending between the plurality of side surfaces; a support flange extending from the bottom surface; and a first vent extending between one of the plurality of side surfaces and the bottom surface such that the first vent includes a first vent opening in the one of the plurality of side surfaces and a second vent opening in the bottom surface, wherein when the base is positioned on the supporting surface, the support flange contacts the supporting surface, and wherein the support flange extends around an entire periphery of the base such that the second vent opening is entirely enclosed between the bottom surface, the support flange, and the supporting surface.

15. The base of claim 14, further comprising a second vent extending between another of the plurality of side surfaces and the bottom surface such that the second vent includes a third vent opening in the other of the plurality of side surfaces and a fourth vent opening in the bottom surface.

16. The base of claim 15 wherein the support flange extends around an entire periphery of the base such that the fourth vent opening is entirely enclosed between the bottom surface, the support flange, and the supporting surface.

17. A base for a blender, the base configured to rest on a supporting surface, comprising: a top surface; a plurality of side surfaces extending downwardly from the top surface; a bottom surface extending between the plurality of side surfaces; a support flange extending from the bottom surface; an outlet port including an outlet port opening in the bottom surface; and an exhaust vent extending between one of the plurality of side surfaces and the bottom surface such that the exhaust vent includes a first exhaust vent opening in the one of the plurality of side surfaces and a second exhaust vent opening in the bottom surface, wherein when the base is positioned on the supporting surface, the support flange contacts the supporting surface, and wherein the support flange extends around an entire periphery of the base such that the outlet port opening and the second exhaust vent opening are entirely enclosed between the bottom surface, the support flange, and the supporting surface.

18. The base of claim 17, wherein the outlet port opening and the second exhaust fan opening are horizontally spaced apart from each other in the bottom surface.

19. The base of claim 17, wherein the first exhaust vent opening is positioned vertically above the support flange.

20. The base of claim 17, wherein the first exhaust vent opening is positioned vertically above the bottom surface.

* * * * *